US009118879B2

(12) United States Patent
Liu et al.

(10) Patent No.: US 9,118,879 B2
(45) Date of Patent: Aug. 25, 2015

(54) CAMERA ARRAY SYSTEM

(71) Applicants: Himax Technologies Limited, Tainan (TW); Himax Imaging Limited, Tainan (TW)

(72) Inventors: Yi-Nung Liu, Tainan (TW); Chih-Tsung Shen, Tainan (TW); Po-Yen Su, Tainan (TW); Huan-Pin Tseng, Tainan (TW)

(73) Assignees: Himax Technologies Limited, Tainan (TW); Himax Imaging Limited, Tainan (TW)

( * ) Notice: Subject to any disclaimer, the term of this patent is extended or adjusted under 35 U.S.C. 154(b) by 25 days.

(21) Appl. No.: 14/156,104

(22) Filed: Jan. 15, 2014

(65) Prior Publication Data

US 2015/0163471 A1    Jun. 11, 2015

(30) Foreign Application Priority Data

Dec. 9, 2013  (TW) .............................. 102145046 A

(51) Int. Cl.
*H04N 9/64*    (2006.01)
*H04N 9/07*    (2006.01)
*H04N 9/04*    (2006.01)

(52) U.S. Cl.
CPC ............... *H04N 9/646* (2013.01); *H04N 9/045* (2013.01); *H04N 9/07* (2013.01)

(58) Field of Classification Search
CPC .......... H04N 2209/043; H04N 5/2258; H04N 5/3355
See application file for complete search history.

(56) References Cited

U.S. PATENT DOCUMENTS

2010/0142839 A1*  6/2010  Lakus-Becker ............... 382/244
2010/0265316 A1*  10/2010  Sali et al. ........................ 348/46

FOREIGN PATENT DOCUMENTS

WO    2013119706 A1    8/2013

OTHER PUBLICATIONS

C. Rhemann, A. Hosni, M. Bleyer, C. Rother, and M. Gelautz, "Fast Cost-Volume Filtering for Visual Correspondence and Beyond," CVPR, 2011, pp. 3017-3024.

* cited by examiner

*Primary Examiner* — Mekonnen Dagnew
(74) *Attorney, Agent, or Firm* — Donald E. Stout; Stout, Uxa & Buyan, LLP

(57) ABSTRACT

A camera array system includes an image sensor device, a hybrid color filter array disposed above the image sensor device, and a lens array disposed above the hybrid color filter array. The hybrid color filter array includes plural kinds of monochromatic color filters and at least one mosaic filter; and the lens array includes a number of optic lenses. The at least one mosaic filter is utilized to perform stereo matching in order to estimate depth information.

12 Claims, 3 Drawing Sheets

| G | R | G | R | G | R |
|---|---|---|---|---|---|
| B | G | B | G | B | G |
| G | R | G | R | G | R |
| B | G | B | G | B | G |
| G | R | G | R | G | R |
| B | G | B | G | B | G |

| G | R | G | R |
|---|---|---|---|
| B | G | B | G |
| G | R | G | R |
| B | G | B | G |

FIG.3A

| E | R | E | R |
|---|---|---|---|
| B | G | B | G |
| E | R | E | R |
| B | G | B | G |

FIG.3B

| C | Y | C | Y |
|---|---|---|---|
| Y | M | Y | M |
| C | Y | C | Y |
| Y | M | Y | M |

FIG.3C

| C | Y | C | Y |
|---|---|---|---|
| G | M | G | M |
| C | Y | C | Y |
| G | M | G | M |

FIG.3D

| W | R | W | R |
|---|---|---|---|
| B | G | B | G |
| W | R | W | R |
| B | G | B | G |

FIG.3E

| W | B | W | G |
|---|---|---|---|
| B | W | G | W |
| W | G | W | R |
| G | W | R | W |

FIG.3F

| G | W | R | W |
|---|---|---|---|
| G | W | R | W |
| B | W | G | W |
| B | W | G | W |

FIG.3G

| G | W | R | W |
|---|---|---|---|
| B | W | G | W |
| G | W | R | W |
| B | W | G | W |

FIG.3H

CAMERA ARRAY SYSTEM

BACKGROUND OF THE INVENTION

1. Field of the Invention

The disclosure generally relates to a camera array system, and more particularly to a camera array system with a hybrid color filter array.

2. Description of Related Art

A Bayer filter, as depicted in FIG. 1, is a color filter array composed of red (R), green (G) and blue (B) color filters disposed on a grid of photo-sensors, and specifically configured with a pattern of 50% green, 25% red and 25% blue. The Bayer filter with the photo-sensors forms an image sensor that is widely used in electronic devices such as digital cameras or camcorders.

As each composing color filter of the Bayer filter passes only one color, information of other colors at each pixel position need be calculated by interpolation. Therefore, the image sensor with the Bayer filter has limited resolution and image quality of a captured image. Moreover, image sensor with the Bayer filter suffers cross-talk among color filters of different colors, thereby further degrading image quality of the captured image. In the specification, "cross-talk" refers to an effect that a light transmitted to a pixel stack may also transmit to the neighboring pixel stacks so as to degrade the overall image quality.

For the foregoing reasons, a need has arisen to propose a novel imaging system that is capable of, among others, increasing resolution and eliminating cross-talk.

SUMMARY OF THE INVENTION

In view of the foregoing, it is an object of the embodiment of the present invention to provide a camera array system with a hybrid color filter array that is composed of plural kinds of monochromatic color filters and at least one mosaic filter, according to which high resolution may be feasible, cross-talk among pixel sensors may be eliminated, high dynamic range may be viable, depth information may be effectively estimated, and re-focusing an image may become easier.

According to one embodiment, a camera array system includes an image sensor device, a hybrid color filter array and a lens array. The image sensor device includes a plurality of pixel sensors. The hybrid color filter array is disposed above the image sensor device, the hybrid color filter array including plural kinds of monochromatic color filters and at least one mosaic filter. The lens array is disposed above the hybrid color filter array, the lens array including a plurality of optic lenses. The at least one mosaic filter is utilized to perform stereo matching in order to estimate depth information.

BRIEF DESCRIPTION OF THE DRAWINGS

FIG. 3A to FIG. 3H show some conventional mosaic filters;

DETAILED DESCRIPTION OF THE INVENTION

Figures 1, 2:
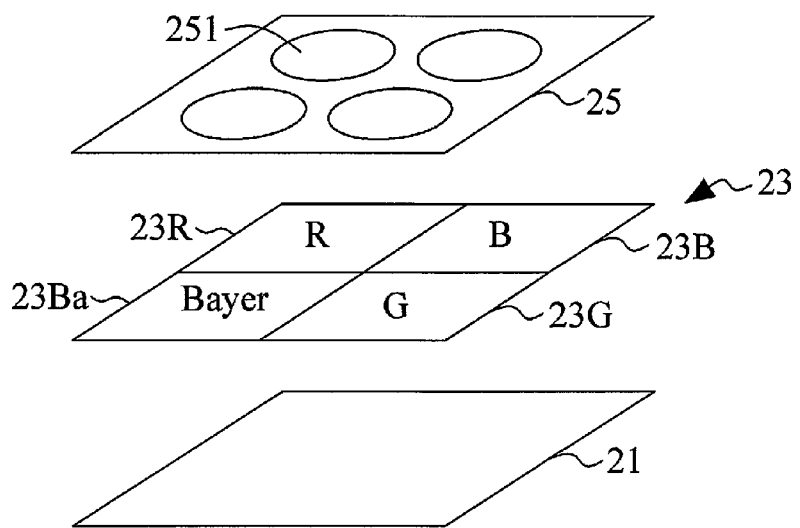
FIG. 1 depicts arrangement of a Bayer mosaic filter.
FIG. 2 shows a schematic diagram illustrating a camera array system according to a first embodiment of the present invention.

FIG. 2 shows a schematic diagram illustrating a camera array system 200 according to a first embodiment of the present invention. In the embodiment, the camera array system 200 includes an image sensor device 21 composed of a number of pixel sensors (not shown). The image sensor device 21 may, for example, be a charge-coupled device (CCD) or a complementary metal-oxide-semiconductor (CMOS) image sensor device. The image sensor device 21 of the embodiment may preferably be a monolithic image sensor device that is manufactured on a single chip.

The camera array system 200 may further include a hybrid color filter array 23 disposed above a surface of the image sensor device 21 that faces incident light. Specifically, the hybrid color filter array 23 may be composed of a number of color filters (four color filters are exemplified in FIG. 2) that are arranged, for example, in a 2×2 (i.e., 2-by-2) array. Accordingly, each color filter correspondingly covers partial pixel sensors disposed below the corresponding color filter.

Generally speaking, the hybrid color filter array 23 may include plural kinds of monochromatic color filters and at least one mosaic filter. In the specification, the term "monochromatic color" (such as red, green or blue) refers to visible or invisible light of a narrow band of wavelengths. The term "mosaic filter," such as a Bayer filter, refers to a color filter array composed of different color filters (such as red filters, green filters and blue filters of Bayer filters, cyan filters, yellow filters, green filters, and magenta filters of CYGM filters, and so on) that are specifically arranged.

Although the Bayer filter is adopted as the mosaic filter in the following embodiments, it is appreciated that other conventional mosaic filters may be adopted instead. FIG. 3A to FIG. 3H show some, but not exclusively, conventional mosaic filters. Specifically speaking, FIG. 3A shows a Bayer filter composed of one blue filter (B), one red filter (R) and two green filters (G) in a 2×2 array. The Bayer filter is one of RGB filters that are constructed with red filter(s), green filter(s) and blue filter(s). FIG. 3B shows a Bayer-like (or RGBE) filter composed of one blue filter (B), one red filter (R), one green filters (G) and one emerald (E) filter in a 2×2 array. In other words, one of the two green filers of the Bayer filter is replaced with one emerald filter. FIG. 3C shows a CYYM filter composed of one cyan filter (C), two yellow filters (Y) and one magenta filter (M) in a 2×2 array. FIG. 3D shows a CYGM filter composed of one cyan (C), one yellow filter (Y), one green filter (G) and one magenta filter (M) in a 2×2 array. FIG. 3E shows a RGBW Bayer filter composed of one red filter (R), one green filter (G), one blue filter (B) and one white filter (W) in a 2×2 array. The RGBW Bayer filter is similar to the Bayer filter with one of the two green filers of the Bayer filter being replaced with one white filter. FIG. 3F shows a first alternative RGBW filter composed of two red filters (R), four green filters (G), two blue filters (B) and eight white filters (W) in a 4×4 array with a pattern of 50% white. FIG. 3G shows a second alternative RGBW filter composed of two red filters (R), four green filters (G), two blue filters (B) and eight white filters (W) in a 4×4 array with a pattern of 50% white. FIG. 3H shows a third alternative RGBW filter composed of one red filters (R), two green filters (G), one blue filters (B) and four white filters (W) in a 2×4 array with a pattern of 50% white.

In the exemplary embodiment shown in FIG. 2, the hybrid color filter array 23 includes a red filter 23R, a green filter 23G, a blue filter 23B and a Bayer filter 23Ba arranged in a 2×2 array. It is appreciated that the relative positions of the color filters 23R, 23G, 23B and 23Ba need not be restricted to those exemplified in FIG. 2. For example, the red filter 23R or the green filter 23G may, but not necessarily, be at a side of the Bayer filter 23Ba.

The camera array system 200 may further include a lens array 25 disposed above a surface of the hybrid color filter array 23 that faces incident light. The lens array 25 of the embodiment may preferably be a wafer-level optics (WLO) lens array that is manufactured at the wafer level using semiconductor techniques such that miniaturized optics with reduced form factor may be made in a cost effective manner. Specifically, the lens array 25 may be composed of a number of optic lenses 251 (four optic lens 251 are exemplified in FIG. 2) that are arranged, for example, in a 2×2 array. Accordingly, each optic lens 251 correspondingly covers a color filter 23R/23G/23B/23Ba disposed below the corresponding optic lens 251. It is appreciated that the optic lens 251 may, but not necessarily, have different optical parameters to facilitate distinct applications.

According to one aspect of the embodiment, both monochromatic color filters (e.g., a red filter 23R, a green filter 23G and a blue filter 23B) and the mosaic filter (e.g., a Bayer filter 23Ba) are mixedly adopted in the hybrid color filter array 23, a reason that the hybrid color filter array 23 being named. The monochromatic color filters 23R/23G/23B advantageously make high resolution (usually referred as super resolution) feasible. The use of the monochromatic color filters 23R/23G/23B also eliminates cross-talk among pixel sensors of the image sensor device 21. On the other hand, the mosaic filter 23Ba affords benefit of substantially high dynamic range owing to the different color filters (such as red filters, green filter and blue filters) that make up the mosaic filter 23Ba.

Figure 4:
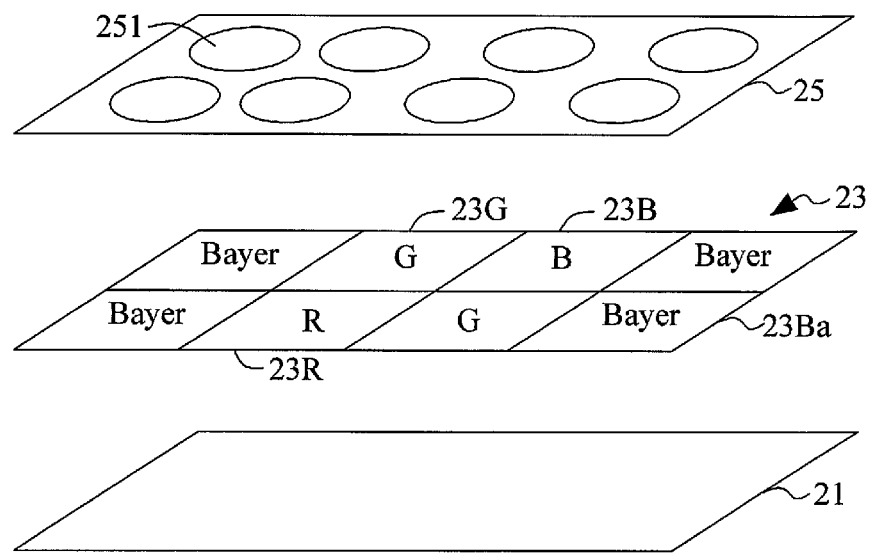
FIG. 4 shows a schematic diagram illustrating a camera array system according to a second embodiment of the present invention.

FIG. 4 shows a schematic diagram illustrating a camera array system 210 according to a second embodiment of the present invention. The second embodiment exemplified in FIG. 4 is similar to the first embodiment exemplified in FIG. 2 with some differences that will be described later. The similarity to the first embodiment will be omitted for brevity. The camera array system 210 according to the present embodiment exemplified in FIG. 4 may include an image sensor device 21, a hybrid color filter array 23 disposed above the image sensor device 21, and a lens array 25 disposed above the hybrid color filter array 23.

In the embodiment, the hybrid color filter array 23 may be composed of eight, instead of four, color filters that are arranged, for example, in a 2×4 (i.e., 2-by-4) array. Accordingly, each color filter correspondingly covers partial pixel sensors disposed below the corresponding color filter.

In the embodiment, the hybrid color filter array 23 includes a red filter 23R, two green filters 23G, a blue filter 23B and four Bayer filters 23Ba arranged in a 2×4 array. Specifically, the four Bayer filters 23Ba are disposed in the four corners of the hybrid color filter array 23, respectively, assuming the hybrid color filter array 23 is rectangular in shape. The two green filters 23G are disposed diagonally, such that the two green filters 23B are not at sides of each other. The red filter 23R and the blue filter 23B are disposed diagonally, such that the red filter 23R and the blue filter 23B are not at sides of each other.

In the embodiment, the lens array 25 may be composed of eight, instead of four, optic lenses 251 that are arranged in a 2×4 array. Accordingly, each optic lens 251 correspondingly covers a color filter 23R/23G/23B/23Ba disposed below the corresponding optic lens 251.

The present embodiment of FIG. 4 shares advantages with the previous embodiment of FIG. 2, and, furthermore, according to one aspect of the present embodiment, the four Bayer filters 23Ba respectively disposed in the four corners of the hybrid color filter array 23 may further facilitate re-focusing an image utilizing the different color filters (such as red filters, green filter and blue filters) that make up each of the mosaic filters 23Ba.

According to the disclosed architecture presented in the embodiments as discussed above, each color filter 23R/23G/23B/23Ba with the corresponding optic lens 251 and corresponding pixel sensors forms an imager. As the formed imagers receive incident light from distinct optic lenses 251, respectively, difference in position (commonly referred as disparity) between corresponding points in two images respectively captured by two imagers inevitably occurs. The disparity is inversely proportional to scene depth. Stereo matching is thus commonly employed to solve correspondence problem between the corresponding points in two images.

Figure 5:
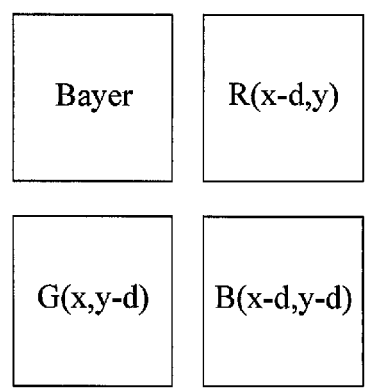
FIG. 5 schematically shows four images captured by an imager with a Bayer filter, an imager with a red filter, an imager with a green filter and an imager with a blue filter, respectively.

According to another aspect of the embodiments, the mosaic filter (e.g., a Bayer filter 23Ba) is utilized to perform stereo matching in order to effectively determine (or estimate) depth information. FIG. 5 schematically shows four images (e.g., Bayer, R, G, B images) captured by an imager with a Bayer filter, an imager with a red (R) filter, an imager with a green (G) filter and an imager with a blue (B) filter, respectively. While performing stereo matching, the R image is displaced along X (or horizontal) axis with displacement d (the displaced R image being denoted as $R(x-d,y)$; the G image is displaced along Y (or vertical) axis with displacement d (the displaced G image being denoted as $G(x,y-d)$; and the B image is displaced along x and y axes with displacements d, respectively (the displaced B image being denoted as $B(x-d,y-d)$.

For a given displacement d, the displaced R, G and B images compose (synthesize) to result in a composed image. Similarity between the (displaced) composed image and the (non-displaced) Bayer image is then measured using a metric such as sum of absolute differences (SAD) or sum of squared differences (SSD). With respect to a pixel of an image, depth information (which is inversely proportional to the displacement) may thus be obtained according to a least value among the measured metrics. As four images (or views) are utilized in the embodiment, compared to two views used in a conventional scheme, depth can thus be estimated more accurately.

Alternatively, depth information may be obtained (or estimated) by other conventional depth-estimation algorithms. In one embodiment, for example, absolute difference of color and gradient between the (displaced) composed image and the (non-displaced) Bayer image is calculated in a pixel-by-pixel manner. The calculated differences (or costs) are accumulated to construct a three-dimensional cost-volume, which is then filtered, and finally least value in the filtered cost-volume is determined or selected, according to which depth information may thus be obtained. Details about the algorithm may be referred to "Fast Cost-Volume Filtering for Visual Correspondence and Beyond," by C. Rhemann et al., IEEE Computer Vision and Pattern Recognition, 2011, the disclosure of which is hereby incorporated herein by reference.

Although specific embodiments have been illustrated and described, it will be appreciated by those skilled in the art that various modifications may be made without departing from the scope of the present invention, which is intended to be limited solely by the appended claims.

What is claimed is:

1. A camera array system, comprising:
   an image sensor device including a plurality of pixel sensors;

a hybrid color filter array disposed above the image sensor device, the hybrid color filter array including plural kinds of monochromatic color filters and at least one mosaic filter; and a lens array disposed above the hybrid color filter array, the lens array including a plurality of optic lenses;

wherein the at least one mosaic filter is utilized to perform stereo matching in order to estimate depth information;

wherein the hybrid color filter array comprises a mosaic filter, a red filter, a green filter and a blue filter arranged in a 2×2 array, the mosaic filter including a Bayer filter, RGB filter, RGBE filter, CYYM filter, CYGM filter, RGBW Bayer filter or RGBW filter.

2. The system of claim 1, wherein the image sensor device comprises a monolithic image sensor device.

3. The system of claim 1, wherein the plural kinds of monochromatic color filters comprise at least one red filter, at least one green filter and at least one blue filter.

4. The system of claim 1, wherein the at least one mosaic filter comprises at least one Bayer filter, RGB filter, RGBE filter, CYYM filter, CYGM filter, RGBW Bayer filter or RGBW filter.

5. The system of claim 1, wherein each of the optic lenses correspondingly covers a color filter disposed below the corresponding optic lens.

6. The system of claim 1, wherein the lens array comprises a wafer-level optics (WLO) lens array.

7. The system of claim 1, wherein the lens array comprises four optic lenses arranged in a 2×2 array, each of the optic lenses correspondingly covers one of the mosaic filter, the red filter, the green filter and the blue filter disposed below the corresponding optic lens.

8. A camera array system, comprising:
an image sensor device including a plurality of pixel sensors;
a hybrid color filter array disposed above the image sensor device, the hybrid color filter array including plural kinds of monochromatic color filters and at least one mosaic filter; and
a lens array disposed above the hybrid color filter array, the lens array including a plurality of optic lenses;
wherein the at least one mosaic filter is utilized to perform stereo matching in order to estimate depth information;
wherein the hybrid color filter array comprises a red filter, two green filters, a blue filter and four mosaic filters arranged in a 2×4 array, the four mosaic filter including four Bayer filters, RGB filters, RGBE filters, CYYM filters, CYGM filters, RGBW Bayer filters or RGBW filters.

9. The system of claim 8, wherein the four mosaic filters are disposed in the four corners of the hybrid color filter array, respectively, the two green filters are disposed diagonally, and the red filter and the blue filter are disposed diagonally.

10. The system of claim 9, wherein the lens array comprises eight optic lenses arranged in a 2×4 array, each of the optic lenses correspondingly covers one of the red filter, the two green filters, the blue filter and the four mosaic filters disposed below the corresponding optic lens.

11. A camera array system, comprising:
an image sensor device including a plurality of pixel sensors;
a hybrid color filter array disposed above the image sensor device, the hybrid color filter array including plural kinds of monochromatic color filters and at least one mosaic filter; and
a lens array disposed above the hybrid color filter array, the lens array including a plurality of optic lenses;
wherein the at least one mosaic filter is utilized to perform stereo matching in order to estimate depth information;
wherein while performing the stereo matching, captured images corresponding to the plural kinds of monochromatic color filters are displaced for each one of displacements; the displaced images compose to result in a composed image; similarity between the composed image and a mosaic image captured by the mosaic filter is then measured using a metric; and depth information is obtained according to a least value among measured metrics with respect to each pixel of an image.

12. The system of claim 11, wherein the metric comprises a sum of absolute differences (SAD), a sum of square differences (SSD) or a cost-volume.

* * * * *